United States Patent
Kim

(10) Patent No.: US 6,757,271 B1
(45) Date of Patent: Jun. 29, 2004

(54) METHOD FOR PROVIDING A DATA SERVICE IN A CDMA COMMUNICATIONS SYSTEM

(75) Inventor: Jung-Sik Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/369,505

(22) Filed: Aug. 6, 1999

(30) Foreign Application Priority Data

Aug. 6, 1998 (KR) .......................................... 1998-32047

(51) Int. Cl.[7] .......................... H04B 7/216; H04M 3/42
(52) U.S. Cl. ..................... 370/342; 370/441; 455/414.2
(58) Field of Search ................................ 370/335, 342, 370/441, 208, 209, 320; 455/403, 414.1, 466, 566, 414.2, 414.3

(56) References Cited

U.S. PATENT DOCUMENTS

| 5,345,448 A | | 9/1994 | Keskitalo ..................... 455/439 |
| 5,881,056 A | * | 3/1999 | Huang et al. ................ 370/335 |
| 6,041,124 A | * | 3/2000 | Sugita ......................... 455/414 |
| 6,075,778 A | * | 6/2000 | Sugita ......................... 370/335 |

FOREIGN PATENT DOCUMENTS

| JP | 9-172685 | 6/1997 |
| JP | 9-327074 | 12/1997 |

OTHER PUBLICATIONS

The First Office Action of The Patent Office of the People's Republic of China issued Aug. 23, 2002 in a counterpart application, namely, 9980 1307.2.
PCT International Search Report—dated Feb. 28, 2000.

* cited by examiner

*Primary Examiner*—Quochien B. Vuong
(74) *Attorney, Agent, or Firm*—Dilworth & Barrese, LLP

(57) ABSTRACT

A method for providing a data service in a CDMA communications system includes sending, at a base station, information about a free data channel to a plurality of mobile stations on a common channel; and sending, at the base station, specified free data to the plurality of mobile stations on the free data channel. The method may also include demodulating, at a mobile station, a common channel received from a base station to detect information about a free data channel; and demodulating, at the mobile station, the free data channel received from the base station according to the information about the free data channel and receiving the corresponding free data.

24 Claims, 2 Drawing Sheets

METHOD FOR PROVIDING A DATA SERVICE IN A CDMA COMMUNICATIONS SYSTEM

BACKGROUND OF THE INVENTION

1. Field of the Invention

The present invention relates generally to a code division multiple access (CDMA) mobile communications system and, more particularly, to a method for providing a free data service and a charging data service.

2. Description of the Related Art

In a CDMA mobile communications system, it is generally required for a base station to assign at least one orthogonal code for data communications to each of a plurality of mobile stations that request a data service. User data, such as voice signal and packet data, are communicated on dedicated channels that are separately established between the base station and each individual mobile station.

For that reason, in the related art CDMA communications system, the base station has to separately assign dedicated channels to each individual mobile station in order to communicate the same data (e.g., packet data) to each of the multiple mobile stations.

In a case where the identical data supplied by the system is free information available at any time at a plurality of mobile stations, the related art utilizes dedicated channels separately assigned to each of the mobile stations is a very inefficient method that requires unnecessary communication path and results in deterioration of data rate. It is therefore possible for the base station to assign a channel resource efficiently by using a specified channel assigned to send free information to the multiple mobile stations. This enables a plurality of subscribers to be served with free data service of small quantity, such as daily weather and stock information, through terminals at any time.

On the other hand, when the data supplied by the system is free information of large quantity, such as Internet services and the like, the base station has to send charging data only to the mobile stations that request the charging data service. And, the mobile stations receiving the charging data services must send billing information to the base station. For this procedure, there is a need of separately establishing and assigning forward and reverse link channels for data communications between the base station and the individual mobile stations that request the charging data service.

SUMMARY OF THE INVENTION

It is, therefore, an object of the present invention to provide a method for providing a charging data service and a free data service using channels efficiently assigned in a CDMA mobile communications system.

It is another object of the present invention to provide a method for providing a free data service in a CDMA mobile communications system, in which a base station sends information about a free data channel to a plurality of mobile stations on a common channel and then sending specified free data to the plural mobile stations on the free data channel.

It is further another object of the present invention to provide a method for providing a free data service in a CDMA mobile communications system, in which a mobile station demodulates a common channel received from a base station to detect information about a free data channel, demodulating the free data channel received from the base station according to the information about the free data channel and receiving the corresponding free data.

It is still further another object of the present invention to provide a method for providing a charging data service in a CDMA mobile communications system, in which a base station sends a first charging data channel information to a plurality of mobile stations on a common channel, assigning the charging data channels upon receiving a charging data service request message from a specified mobile station, sending a second charging data channel information to the mobile station requesting the charging data channel service on the common channel, and sending the corresponding charging data to the mobile station through the corresponding charging data channel upon receiving a service request confirm message from the mobile station.

It is still further another object of the present invention to provide a method for providing a charging data service in a CDMA mobile communications system, in which a mobile station demodulates a first charging data channel information on a common channel, sending the type of desired charging data and an ID code of its own to a base station through an access channel to request the charging data service, detecting a second charging data channel information on the common channel, sending a charging data service request confirm message to the base station on the access channel, and receiving the specified charging data on the corresponding charging data channels assigned thereto.

To achieve the above objects, there is provided a method for providing a data service in a CDMA communications system including the steps of: sending, at a base station, information about a free data channel to a plurality of mobile stations on the a common channel; and sending, at the base station, specified free data to the plural mobile stations on the free data channel.

According to another embodiment of the present invention, there is provided a method for providing a data service in a CDMA communications system including the steps of: demodulating, at a mobile station, a common channel received from a base station to detect information about a free data channel; and demodulating, at the mobile station, the free data channel received from the base station according to the information about the free data channel and receiving the corresponding free data.

According to further another embodiment of the present invention, there is provided a method for providing a data service in a CDMA communications system includes the steps of: (a) sending, at a base station, first charging data channel information to a plurality of mobile stations on a common channel; (b) receiving, at the base station, a charging data service request message from the specified mobile station; (c) assigning, at the base station, charging data channels and sending second charging data channel information to the mobile station on the common channel; and (d) sending, at the base station, specified charging data to the mobile station on the charging data channels upon receiving a service request confirm message from the mobile station.

According to still further another embodiment of the present invention, there is provided a method for providing a data service in a CDMA communications system including the steps of: (a) demodulating, at a mobile station, first charging data channel information on a common channel; (b) sending, at the mobile station, the type of charging data desired and an ID code of its own to a base station on an access channel and sending a charging data service request message to the base station; (c) detecting, at the mobile station, second charging data channel information on the common channel and sending a charging data service request confirm message to the base station; and (d) receiving, at the mobile station, the specified charging data on charging data channels assigned.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF THE PREFERRED EMBODIMENT

A preferred embodiment of the present invention will be described herein below with reference to the accompanying drawings. In the following description, well known functions or constructions are not described in detail since they would obscure the invention in unnecessary detail.

In the preferred embodiment of the present invention, to provide a free data service, a base station assigns a predetermined number of channels on which free data will be transmitted, and sends the free data to a plurality of mobile stations through the free data channels assigned. The base station also sends information about free data channels to the plural mobile stations through a common channel. Here, the common channel may be a paging channel.

To be served with the free data service, the individual mobile station demodulates a common channel received from the base station to detect information about the free data channels. The free data channel information includes orthogonal codes used for the corresponding free data channels, the type and the number of the free data, and continuous transmit information or time-division transmit information, etc. When the continuous transmit information is included in the free data channel information, it may be understood that the free data is transmitted continuously by the frame unit. With the time-division transmit information included in the free data channel information, the free data is transmitted by the frame unit that is divided into time slots of the multiple mobile stations. Here, the time-division transmit information may include the number of the time slots for the frame unit and the time-division period. The channel on which the free data is transmitted may be a fundamental channel.

Figure 1:
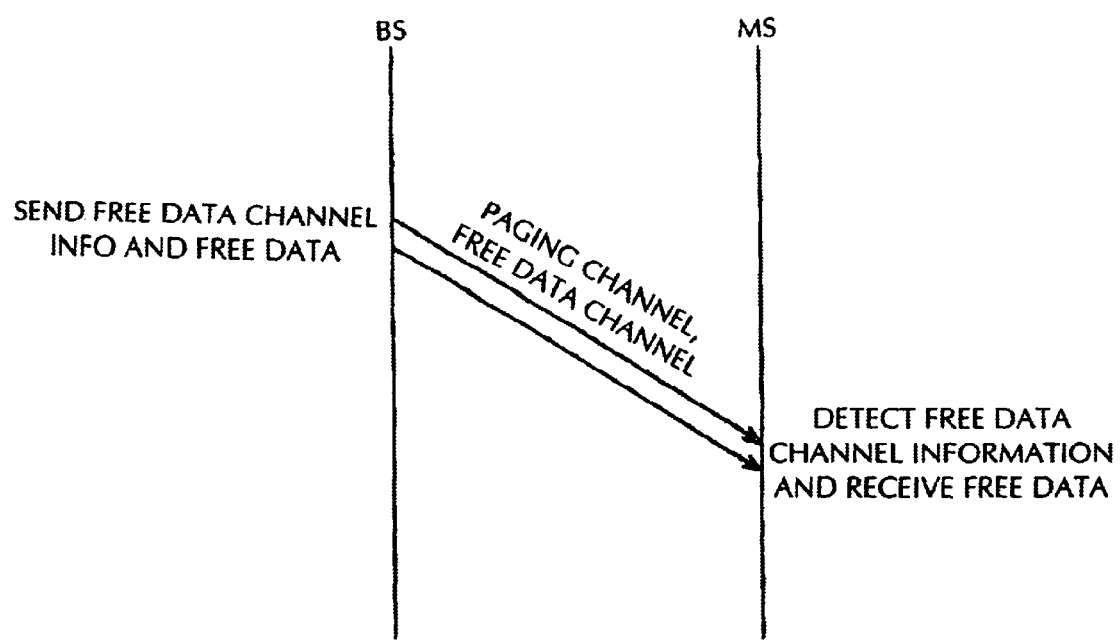
FIG. 1 is a diagram illustrating a procedure of providing a free data service between a base station and a plurality of mobile stations in accordance with an embodiment of the present invention.

Referring to FIG. 1, there is shown a diagram illustrating a procedure of providing a free data service between a base station and a plurality of mobile stations in accordance with the embodiment of the present invention.

The base station sends free data channel information to each individual mobile station on a common channel and also sends free data to the multiple mobile stations on the free data channels.

The individual mobile station detects the free data channel information from the common channel and, according to the detected information, demodulates the free data channels to receive the free data.

In the preferred embodiment of the present invention, to provide a charging data service, the base station assigns a predetermined number of channels on which charging data will be transmitted. The base station sends first charging data channel information to a plurality of mobile stations through a paging channel. The first charging data channel information may be information used to select the type of desired charging data. At this time, the base station and the mobile stations that desire the charging data service start to perform channel negotiation so that the base station assigns charging data channels to the mobile stations.

To be served with the charging data service, the individual mobile station demodulates the common channel received from the base station to detect the first charging data channel information. The common channel may be a paging channel. Then, the mobile station sends the type of the charging data to be served and an ID code to the base station through an access channel to order the charging data service. The ID code may be an ID number of the specified mobile station or an international mobile station ID number.

Upon receiving a charging data service request message from the specified mobile station, the base station sends second charging data channel information to the mobile station through the common channel. The common channel may be a paging channel. Then, the mobile station demodulates the common channel received from the base station to detect the second charging data channel information. The second charging data channel information includes orthogonal codes corresponding to the type of the charging data to be served, continuous transmit information or time-division transmit information, the password for the ID code of the mobile station requesting the charging data service, and a start point of the corresponding time slot, etc. Here, the password is used by the base station to encrypt the charging data lest other users should have access to the charging data intentionally.

If the continuous transmit information is included in the second charging data channel information, it may be understood that the charging data is transmitted continuously by the frame unit. With the time-division transmit information included in the second charging data channel information, the charging data is transmitted by the frame unit that is divided into time slots of the multiple mobile stations. Here, the time-division transmit information may include the number of the time slots for the frame unit and the time-division period.

Upon receiving the second charging data channel information from the base station, the individual mobile station sends a service request confirm message to the base station through an access channel. In response to the service request confirm message, the base station sends the desired charging data to the mobile station on the corresponding forward link charging data channel. When receiving the charging data, the mobile station sends billing information for the charging data or a charging data service ending request message to the base station through the corresponding reverse link charging data channel.

If the charging data is transmitted continuously, the mobile station sends billing information to the base station on the reverse link charging data channel every time it receives the charging data by the frame unit. Here, the billing information includes a password for the ID code and a continued-service request message. If the charging data is transmitted on a time-division basis, the mobile station sends the billing information inclusive of the password for the ID code and the continued-service request message to the base station on the reverse link charging data channel at the start point of the time slots of its' own.

The base station interrupts the charging data service immediately when it fails to receive the billing information or receives the service ending request message from the mobile station. The base station also sends a charging data service ending message to the mobile station on the forward link charging data channel and ending the charging data service. The channel on which the charging data are transmitted may be a fundamental channel or a supplemental channel or a dedicated control channel.

Figure 2:
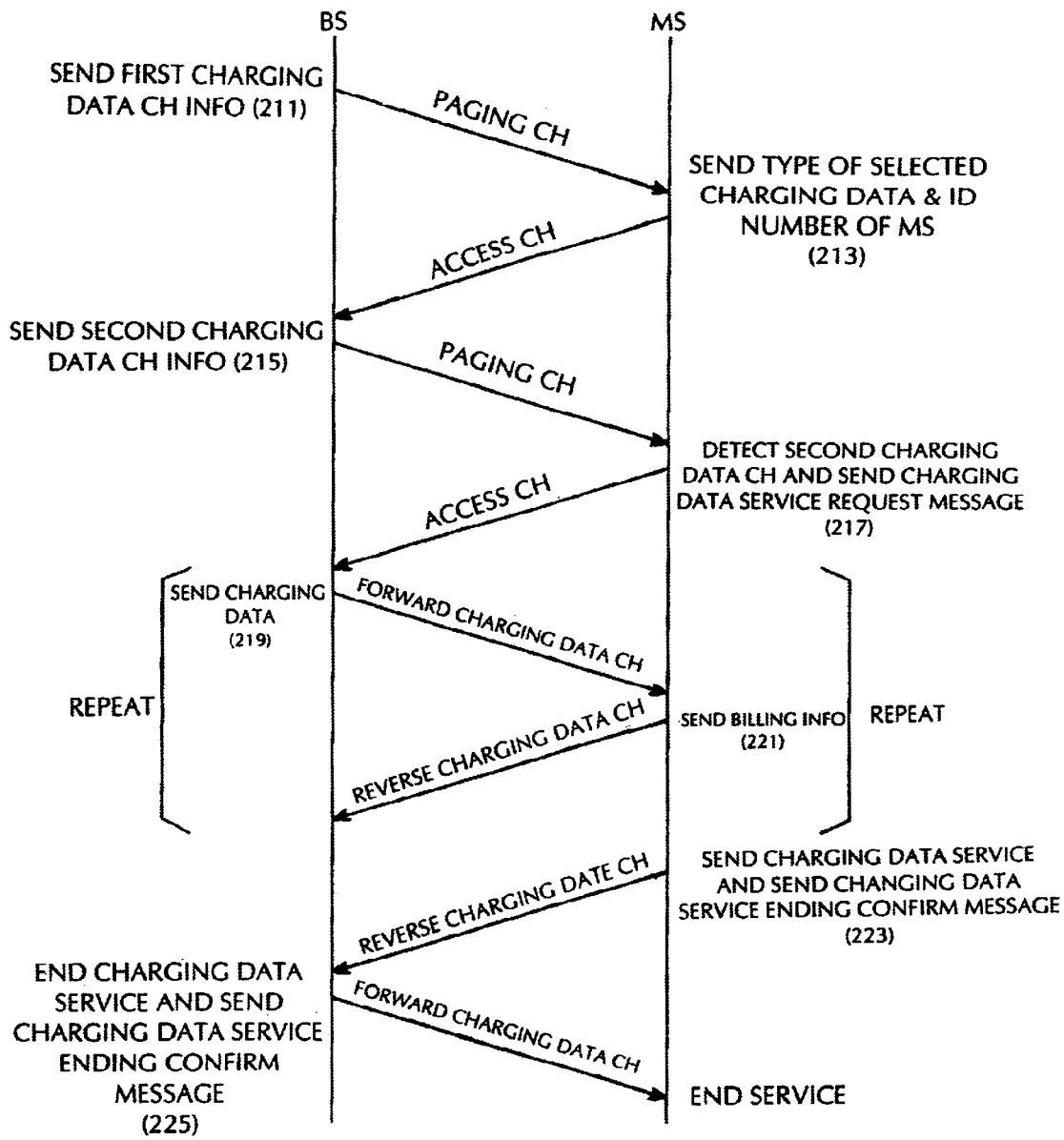
FIG. 2 is a diagram illustrating a procedure of providing a charging data service between the base station and the mobile stations in accordance with the embodiment of the present invention.

Referring now to FIG. 2, there is shown a diagram illustrating a procedure of providing a charging data service communicated between a base station and a plurality of mobile stations in accordance with the embodiment of the present invention.

The base station sends first charging data channel information to each individual mobile station through a common channel, in step 211. The common channel may be a paging channel. The first charging data channel information may be information used to select the type of charging data available. The base station assigns orthogonal codes to the corresponding charging data channel. Here, the charging data channel established between the base station and the individual mobile station is a bidirectional dedicated channel.

In step 213, the mobile station concerned demodulates the paging channel received from the base station to detect the first charging data channel information. Then, the mobile station sends the type of the charging data to be served and an ID code of its own to the base station through an access channel to order a charging data service.

Upon receiving a charging data service request message from the specified mobile station, in step 215, the base station assigns orthogonal codes to the corresponding forward and reverse link charging data channels. And, the base station sends second charging data channel information to the mobile station through the common channel. For the second charging data channel information, there may be included orthogonal codes corresponding to the type of the charging data to be served, continuous transmit information or time-division transmit information, the password for the ID code, and a start point of the corresponding time slot, etc.

In step 217, the mobile station demodulates the common channel received from the base station to detect the second charging data channel information. Then, the mobile station sends a charging data service request confirm message to the base station on the access channel.

Upon receiving the charging data service request confirm message from the mobile station, the base station sends the charging data to the mobile station on the corresponding forward link charging data channel and providing the charging data service, in step 219.

When receiving the charging data from the base station, the mobile station sends billing information for the charging data on the corresponding reverse link charging data channel in step 221, or sends a charging data service ending request message to the base station in step 223. Thereafter, the procedures of steps 219 and 221 are repeatedly performed.

When the base station fails to receive the billing information or receives the charging data service ending request message, it sends a charging data service ending confirm message to the mobile station on the forward link charging data channel and interrupts the charging data service, in step 225.

As stated above, the base station provides free data to the multiple mobile stations on the free data channel in an efficient manner. This allows a number of subscribers to be served with the free data of small quantity, such as daily weather and stock information, etc., at any time.

In a case where the data service is charging data of large quantity, such as Internet service and the like, the base station assigns a predetermined number of charging data channels only to the mobile stations that request the charging data service, and sending the charging data service to the mobile stations through the charging data channels. Then, the mobile stations sends billing information for the charging data service to the base station on the reverse link charging data channels.

As described above, for a free data service, the base station sends free data channel information on the common channel and transmitting free data on the free data channels. For a charging data service, the base station sends charging data channel information to the mobile stations, assigning the charging data channels and sending the charging data to the mobile stations that desire the charging data service. Accordingly, the present invention has an advantage in regard to efficient channel assignment and data service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for providing a data service in a CDMA communications system comprising the steps of:

assigning, at a base station, a common channel for transmission of information about a free data channel, and the free data channel for transmission of free data;

broadcasting, at the base station, the information about the free data channel to a plurality of mobile stations on the common channel; and broadcasting, at the base station, specified free data to the plurality of mobile stations on the free data channel.

2. The method as claimed in claim 1, wherein the information about the free data channel comprises orthogonal codes used for the free data channel and the type and the number of the free data.

3. The method as claimed in claim 2, wherein a plurality of the free data channels can be assigned in the mobile communications system.

4. The method as claimed in claim 3, wherein the common channel is a paging channel.

5. The method as claimed in claim 4, wherein the information about the free data channel further comprises continuous transmit information or time-division transmit information.

6. A method for providing a data service in a CDMA communications system comprising the steps of:

receiving, at a plurality of mobile stations, information broadcasted from a base station about a plurality of free data channels, said free data channels for receiving free data, said information being received on a common channel, said common channel being assigned by said base station; and receiving, at said plurality of mobile stations, said free data, said free data being received on at least one of said plurality of free data channels corresponding to said received information.

7. The method as claimed in claim 6, wherein the information about the free data channel comprises orthogonal codes used for the free data channel and the type and the number of the free data.

8. The method as claimed in claim 7, wherein a plurality of the free data channels can be assigned in the mobile communications system.

9. The method as claimed in claim 8, wherein the common channel is a paging channel.

10. The method as claimed in claim 9, wherein the information about the free data channel further comprises continuous transmit information or time-division transmit information.

11. A method for providing a data service in a CDMA communications system comprising the steps of:
   (a) sending, at a base station, first charging data channel information to a plurality of mobile stations on a common channel;
   (b) receiving, at the base station, a charging data service request message from a specified mobile station;
   (c) assigning, at the base station, charging data channels and sending second charging data channel information to the mobile station on the common channel; and
   (d) sending, at the base station, specified charging data to the mobile station on the charging data channels upon receiving a service request confirm message from the mobile station.

12. The method as claimed in claim 11, wherein in the step (d), the base station receives billing information from the mobile station on the assigned charging data channels every time it sends the charging data by a specified unit to the mobile station.

13. The method as claimed in claim 12, wherein the first charging data channel information comprises information used to select the type of the charging data available.

14. The method as claimed in claim 13, wherein a plurality of the charging data channels can be assigned in the mobile communications system.

15. A method for providing a data service in a CDMA communications system comprising the steps of:
   (a) sending, at a base station, first charging data channel information to a plurality of mobile stations on a common channel;
   (b) receiving, at the base station, a charging data service request message from the specified mobile station;
   (c) assigning, at the base station, charging data channels and sending second charging data channel information to the mobile station on the common channel; and
   (d) sending, at the base station, specified charging data to the mobile station on the charging data channels upon receiving a service request confirm message from the mobile station,
   wherein the second charging data channel information further comprises channel codes corresponding to the type of the charging data desired and password information corresponding to an ID code of the specified mobile station.

16. The method as claimed in claim 15, wherein the second charging data channel information further comprises continuous transmit information or time-division transmit information.

17. The method as claimed in claim 16, wherein the common channel is a paging channel.

18. A method for providing a data service in a CDMA communications system comprising the steps of:
   (a) demodulating, at a mobile station, first charging data channel information on a common channel;
   (b) sending, at the mobile station, the type of charging data desired and an ID code of its own to a base station on an access channel and sending a charging data service request message to the base station;
   (c) detecting, at the mobile station, second charging data channel information on the common channel and sending a charging data service request confirm message to the base station; and
   (d) receiving, at the mobile station, the specified charging data on charging data channels assigned.

19. The method as claimed in claim 18, wherein in the step (d), the mobile station sends billing information to the base station on the assigned charging data channels every time it receives the charging data by a specified unit from the base station.

20. The method as claimed in claim 19, wherein the first charging data channel information comprises information used to select the type of the charging data available.

21. The method as claimed in claim 20, wherein a plurality of the charging data channels can be assigned in the mobile communications system.

22. A method for providing a data service in a CDMA communications system comprising the steps of:
   (a) demodulating, at a mobile station, first charging data channel information on a common channel;
   (b) sending, at the mobile station, the type of charging data desired and an ID code of its own to a base station on an access channel and sending a charging data service request message to the base station;
   (c) detecting, at the mobile station, second charging data channel information on the common channel and sending a charging data service request confirm message to the base station; and
   (d) receiving, at the mobile station, the specified charging data on charging data channels assigned,
   wherein the second charging data channel information further comprises channel codes corresponding to the type of the charging data desired and password information corresponding to the ID code of the specified mobile station.

23. The method as claimed in claim 22, wherein the second charging data channel information further comprises continuous transmit information or time-division transmit information.

24. The method as claimed in claim 23, wherein the common channel is a paging channel.

* * * * *